(12) United States Patent
Furino, Jr.

(10) Patent No.: US 9,166,561 B1
(45) Date of Patent: Oct. 20, 2015

(54) VARIABLE TRANSMISSION LINE

(71) Applicant: TriQuint Semiconductor, Inc., Hillsboro, OR (US)

(72) Inventor: James P. Furino, Jr., Melbourne, FL (US)

(73) Assignee: TriQuint Semiconductor, Inc., Hillsboro, OR (US)

( * ) Notice: Subject to any disclaimer, the term of this patent is extended or adjusted under 35 U.S.C. 154(b) by 74 days.

(21) Appl. No.: 13/940,142

(22) Filed: Jul. 11, 2013

(51) Int. Cl.
*H04B 7/02* (2006.01)
*H03H 11/28* (2006.01)
*H04B 1/10* (2006.01)
*H03C 3/00* (2006.01)

(52) U.S. Cl.
CPC ............. *H03H 11/28* (2013.01); *H04B 1/1036* (2013.01)

(58) Field of Classification Search
CPC ............................... H04B 1/0458; H01Q 5/335
USPC ............... 455/107, 121, 129; 333/22 R, 17.3, 333/124–128; 343/850–852, 860–862
See application file for complete search history.

(56) References Cited

U.S. PATENT DOCUMENTS

2006/0145758 A1* 7/2006 Klomsdorf et al. ............ 330/129
2012/0176205 A1* 7/2012 Furuta et al. .................. 333/17.3

OTHER PUBLICATIONS

Shatzman, J., "An Electronically Reconfigurable Three Band Low-Noise Amplifier 0.5 um GaAs pHEMT Technology," Thesis, Graduate School of the University of Massachusetts Amherst, May 2011, 171 pages.
Walker, C., "Capacitance, Inductance, and Crosstalk Analysis," 1990, pp. 52 and 95, Artech House, Inc., Norwood, MA.

* cited by examiner

*Primary Examiner* — Lee Nguyen
(74) *Attorney, Agent, or Firm* — Withrow & Terranova, P.L.L.C.

(57) ABSTRACT

Embodiments provide a variable-impedance transmission line. In some embodiments, a variable-impedance transmission line may include one or more conductors that may be isolated or configured as parts of forward or return paths based on states of switches of the variable-impedance transmission line. Other embodiments may be described and claimed.

19 Claims, 8 Drawing Sheets

VARIABLE TRANSMISSION LINE

FIELD

Embodiments of the present disclosure relate generally to the field of circuits, and more particularly to a variable transmission line.

BACKGROUND

Efficient operation of radio-frequency (RF) circuits may be highly dependent on platform and environmental characteristics. Adjusting components of these RF circuits to adapt to a particular platform/environment may be difficult given the present state of the art.

BRIEF DESCRIPTION OF THE DRAWINGS

Embodiments are illustrated by way of example and not by way of limitation in the figures of the accompanying drawings, in which like references indicate similar elements.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present disclosure; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms comprising, having, and including are synonymous, unless the context dictates otherwise.

The phrase "coupled with," along with its derivatives, may be used herein. Coupled may mean that two or more elements are in direct physical or electrical contact. However, coupled may also mean that two or more elements indirectly contact each other, but yet still cooperate or interact with each other, and may mean that one or more other elements are coupled or connected between the elements that are said to be coupled with each other.

The phrases "a and/or b" and "a or b" mean (a), (b), or (a and b).

Figure 1A:
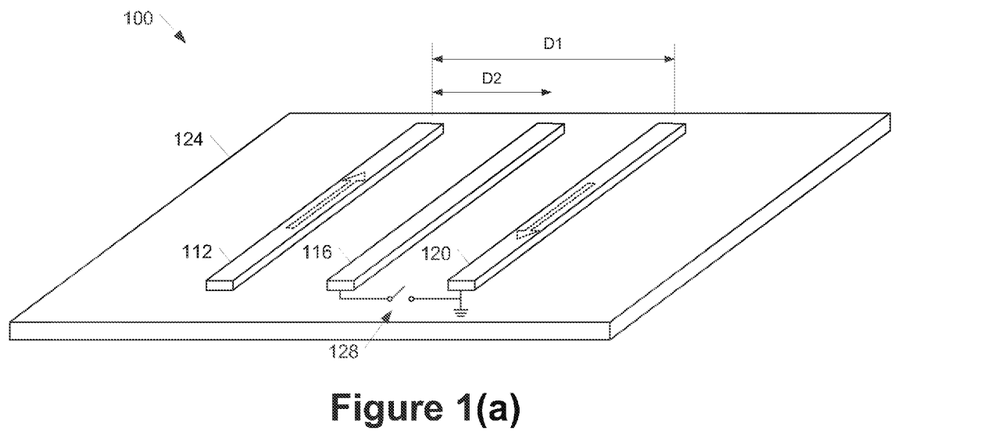
FIGS. 1(a)-1(b) illustrate a variable-impedance device in accordance with some embodiments.
Figure 1B:
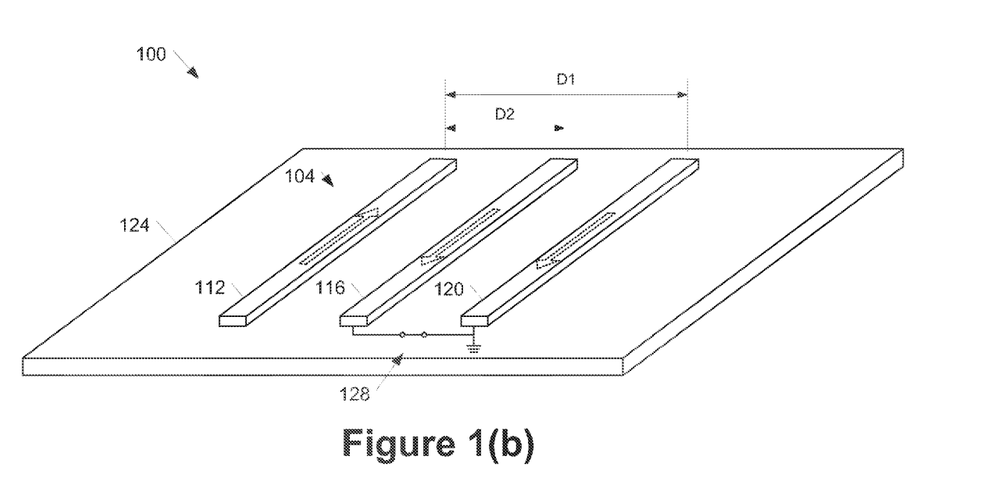

FIGS. 1(a) and 1(b) illustrate a variable-impedance device 100 in accordance with some embodiments. The variable-impedance device 100 (hereinafter "device 100") may include a plurality of conductors such as conductors 112, 116 and 120. The conductors 112, 116, and 120 may be flat conductors that are coupled to a surface of a substrate 124 in parallel with one another. While not specifically shown, the substrate 124 may include other circuit elements coupled with, or integrated within, the substrate 124. Two or more of the other circuit elements may be communicatively coupled with one another by a transmission line provided by the conductors 112, 116, and 120.

The conductor 112 may provide a forward path of the transmission line with current flowing in the direction shown. Conductor 120 may provide a return path of the transmission line that corresponds to the forward path. Current flow in the return path may be equal and opposite to the current flow in the forward path.

The device 100 may further include a switch 128. The switch 128 is shown in a first switch state in FIG. 1(a). While in the first switch state, the conductor 116 may be isolated from the transmission line. In this state, the return path may be provided solely by the conductor 120.

A physical factor, d, of a transmission line may be a distance between centers of parallel conductors that provide the forward and return paths. Thus, in FIG. 1(a), the transmission line may have a physical factor, D1, that corresponds to a distance between centers of conductors 112 and 120. The physical factor may affect inductance per unit length (IPUL) and capacitance per unit length (CPUL) of the transmission line. In particular, IPUL may be proportional to a natural log of the physical factor, while CPUL may be inversely proportional to the natural log of the physical factor. IPUL and CPUL may, in turn, have an effect on the characteristic impedance of the transmission line.

FIG. 1(b) illustrates the switch 128 in a second switch state. While in the second switch state, the conductor 116 may form at least part of the return path. This may be done by coupling the conductor 116 with the conductor 120. In this state, the physical factor may be changed from D1 to D2. Thus, the characteristic impedance, through IPUL and CPUL, may be changed. As will be described herein, providing a transmission line with a variable characteristic impedance may facilitate dynamic and efficient operation of circuits that employ the transmission line.

It may be noted that while FIG. 1(b) shows that both conductors 116 and 120 form the return path, it may be in other embodiments that the conductor 116, and not conductor 120, may provide the return path while the switch 128 is in the second state.

While device 100 has conductor 116 capable of being configured to provide at least part of the return path, other embodiments may additionally/alternatively include the conductor 116 as being capable of being configured, by appropriate control of one or more switches coupled therewith, to provide at least part of the forward path.

Figure 2:
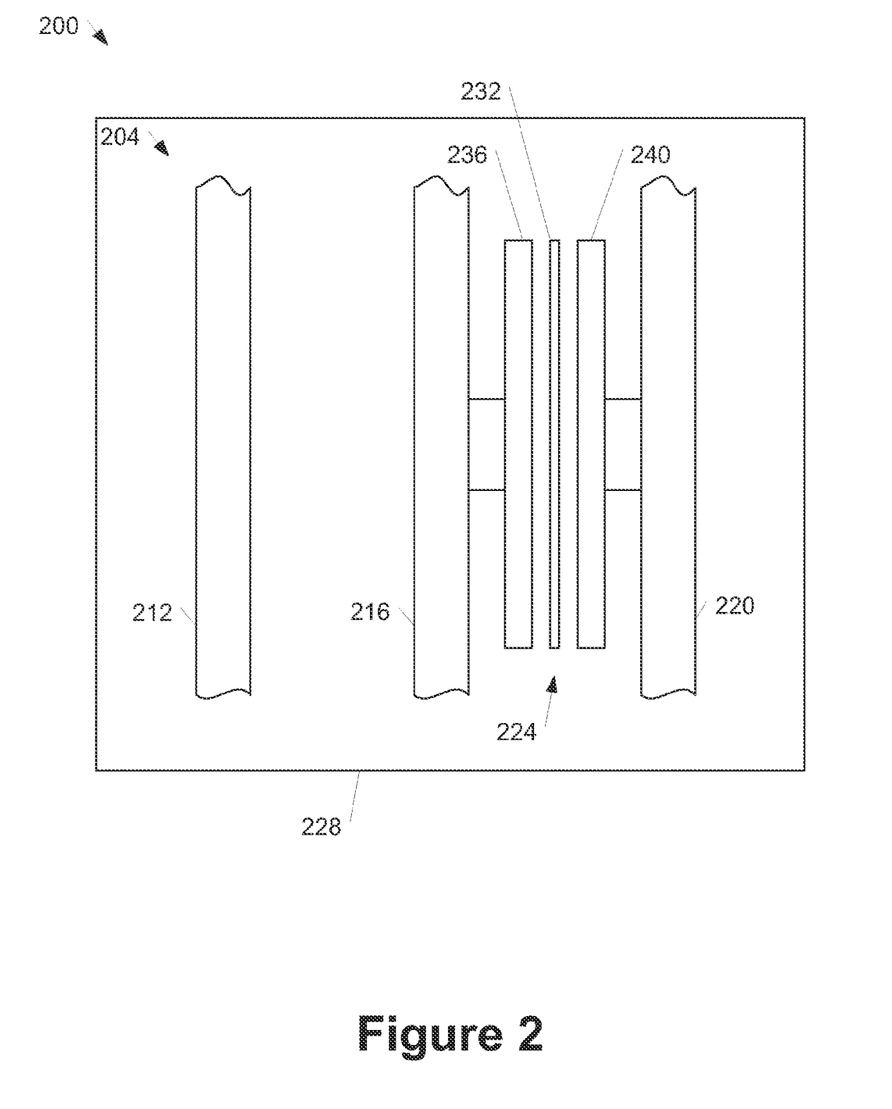
FIG. 2 is a top view of a variable-impedance device in accordance with some embodiments.

FIG. 2 illustrates a top view of a device 200 that includes a transmission line 204 in accordance with some embodiments. The device 200 may be similar to and substantially interchangeable with device 100.

The transmission line 204 may include conductors 212, 216, and 220 and a switch 224 that is coupled with and between conductors 216 and 220. The switch 224 may be a silicon-on-insulator (SOI) switch that is constructed of alternating layers of silicon and an insulator, for example, silicon dioxide or sapphire, in the layers of a substrate 228 on which the transmission line is disposed.

The switch 224 may include a gate 232 between a source 236 and a drain 240. The switch 224 may be a wide switch that is placed in parallel with, or perpendicular to, the conductors 216 and 220. This may provide a desirable low-loss switch.

While the embodiments above describe transmission lines composed of flat conductors disposed on a surface of a substrate, other embodiments may include other types of transmission lines.

Figure 3:
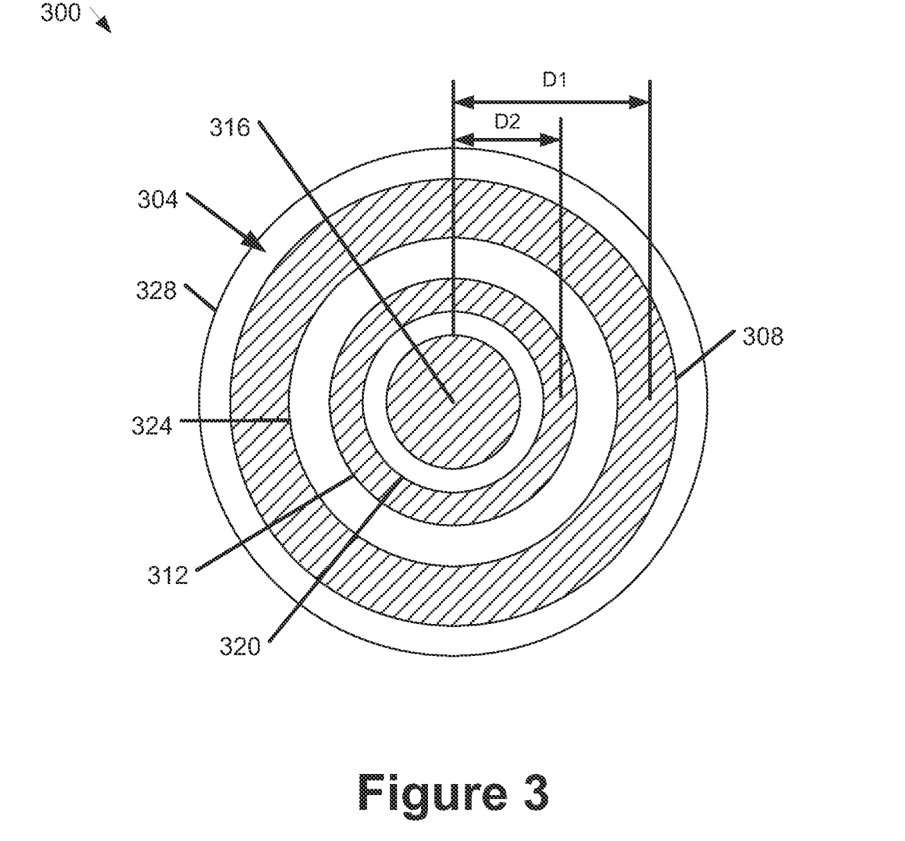
FIG. 3 is a cross-section view of a coaxial cable in accordance with some embodiments.

FIG. 3 is a cross-section view of a coaxial cable 300 in accordance with some embodiments. The coaxial cable 300 may include a coaxial transmission line 304 that includes conductors 308, 312, and 316. The conductors 308, 312, and 316 may be concentric conductors separated by tubular insulating layers 320 and 324. The coaxial cable 300 may also include a dielectric sheath 328.

Figure 4:
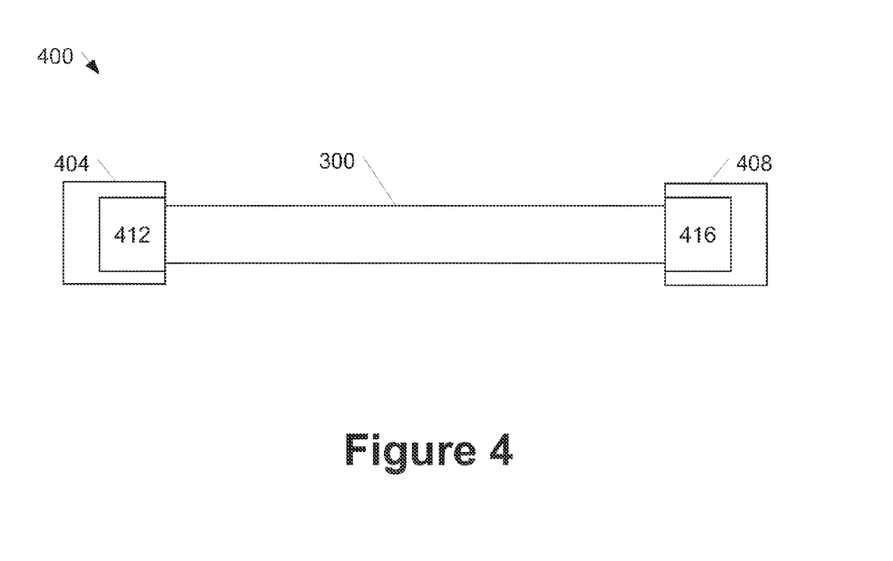
FIG. 4 is a top view of a variable-impedance device including a coaxial cable in accordance with some embodiments.

FIG. 4 illustrates a top view of a device 400 that includes the coaxial cable 300 coupled with termination components 404 and 408. In some embodiments, the termination components 404 and 408 may respectively include switches 412 and 416. The device 400 may work in a similar manner as that described above with respect to device 100.

The switches 412 and 416 may be coupled with the conductors 312 and 308 and may be set in either first or second switch states. In this embodiment, the switches 412 and 416 may be operated in tandem with one another. That is, they will both be either in the first switch state or the second switch state. However, switches in other embodiments may be employed in other manners.

The conductor 316 may provide a forward path of the transmission line 304 with current flowing in a first direction. Conductor 308 may provide a return path of the transmission line 304 with current flowing in a second direction that is opposite the first direction.

While in the first switch states, the conductor 312 may be isolated from the transmission line 304. In this state, the return path may be provided solely by the conductor 308 and the physical factor of the transmission line 304 may be D1. Thus, the transmission line may be associated with a first characteristic impedance.

While in the second switch states, the conductor 312 may form at least part of the return path. This may be accomplished by coupling the conductor 312 with the conductor 308. In the second switch states, the physical factor of the transmission line 304 may be D2.

In this manner, the transmission line 304 may be controlled to provide a first characteristic impedance by setting the switches 412 and 416 in the first switch state, or to provide a second characteristic impedance by setting the switches 412 and 416 in the second switch state.

Figure 5:
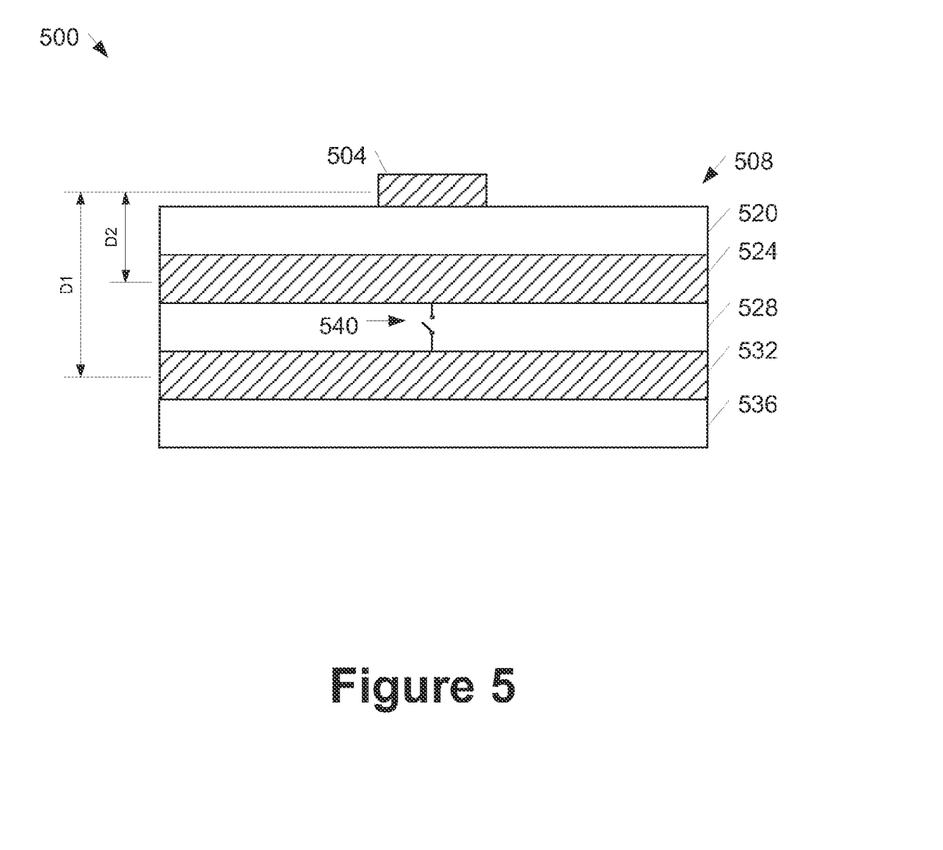
FIG. 5 is a variable-impedance device in accordance with some embodiments.

FIG. 5 illustrates a device 500 in accordance with various embodiments. The device 500 may include a microstrip transmission line as will be described. The device 500 may include a conductor 504 disposed on a surface of a substrate 508.

The substrate 508 may include alternating conductor and insulator layers. For example, the substrate 508 may include, at its surface, an insulator 520. The substrate 508 may include a conductor 524 coupled with the insulator 520. The substrate 508 may include an insulator 528 coupled with the conductor 524. The substrate 508 may include a conductor 532 coupled with the insulator 528 and disposed on an insulator 536. The microstrip transmission line may include conductors 504, 524, and 532.

The substrate 508 may further include a switch 540 coupled between the conductor 524 and the conductor 532. In some embodiments, the switch 540 may be an SOI switch that is similar to that shown and described above with respect to FIG. 2.

While the switch 540 is in a first switch state, for example, an open switch state, the conductor 524 may be isolated from the microstrip transmission line and the return path may be provided solely by the conductor 532. A characteristic impedance of the transmission line may, therefore, be based on the physical factor D1.

While the switch 540 is in a second switch state, for example, a closed switch state, the conductor 524 may form at least part of the return path. A characteristic impedance of the transmission line may then be based on the physical factor D2.

The above embodiments generally illustrate flat conductor, coaxial, and microstrip transmission lines. However, other embodiments may have other types of transmission lines. For example, other embodiments may include stripline, balanced line, quad cable, twin-lead, lecher line, single-wire line, waveguide, or optical fiber transmission lines.

Providing a variable-impedance transmission line as described herein may enable efficient operation of a wide variety of radio frequency communication circuits.

Figure 6:
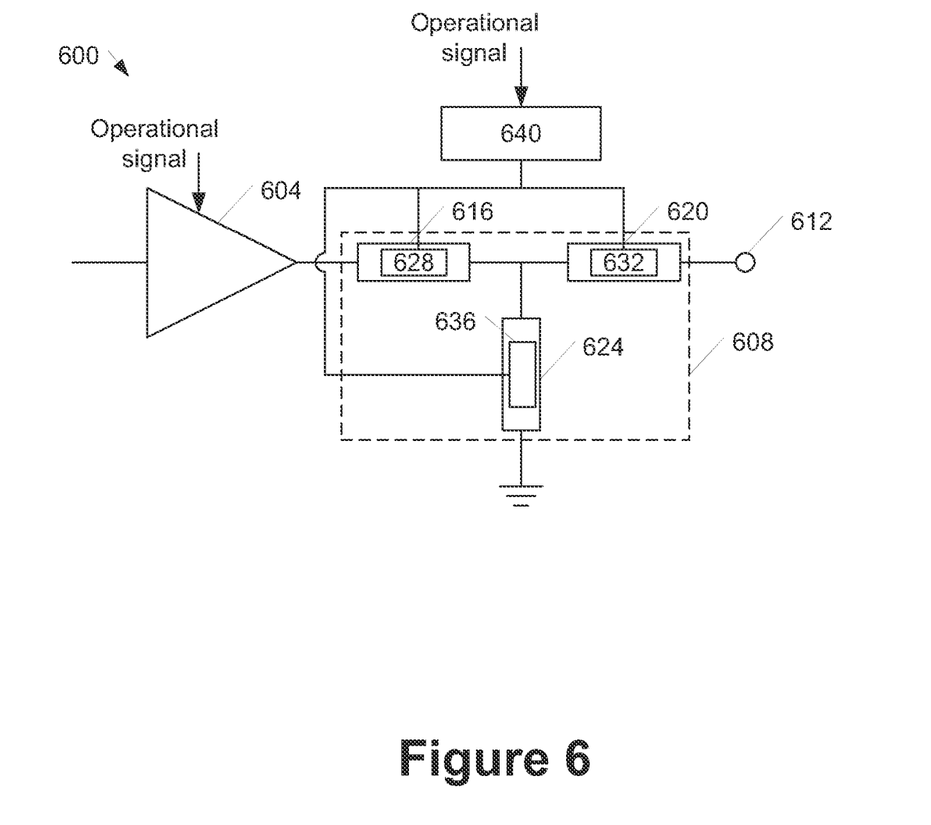
FIG. 6 is a power amplifier circuit in accordance with some embodiments.

FIG. 6 illustrates a power amplifier (PA) circuit 600 in accordance with some embodiments. The PA circuit may include a PA 604 that is to receive an input radio frequency (RF) signal and provide an amplified output RF signal. The PA circuit 600 may further include a matching network 608. The matching network 608 may provide an impedance transformation to match an impedance at an output of the PA 604 with an impedance at an antenna port 612.

The matching network 608 may include one or more series elements, for example, series elements 616 and 620, coupled with one or more shunt elements, for example, shunt element 624. In various embodiments, the matching network 608 may arrange series and shunt elements as a T network (as generally shown), a Pi network, an L network, etc.

The series and shunt elements may include various combinations of circuit components such as capacitors, inductors, and transmission lines. In some embodiments, series element 616 may include variable-impedance transmission line 628; series element 620 may include variable-impedance transmission line 632; and shunt element 624 may include variable-impedance transmission line 636. In other embodiments, less than all of the series and shunt elements may include a variable-impedance transmission line. The variable-impedance transmission lines 628, 632, and 636, which may be similar to any of the transmission lines described herein, may act as electrically variable tuning elements, for example, capacitors, inductors, or both.

The PA circuit 600 may further include a control element 640. The control element 640 may include control lines coupled with one or more switches found in each of the variable-impedance transmission lines of the matching network 608.

In some embodiments, the PA circuit 600 may be dual-mode PA circuit that is designed to provide various levels of amplification depending on, for example, a transmission mode of a wireless communication device employing the PA circuit 600.

The PA 604 may receive an operational signal that provides information on the transmission mode. The PA 604 may then provide one of a plurality of amplification levels, for example, a high or low power amplification level, that corresponds to the selected transmission mode. For high-power amplification, it may be desirable for the matching network 608 to provide a first impedance transformation, and for a low-power amplification, it may be desirable for the matching network 608 to provide a second impedance transformation that is different from the first.

In some embodiments, the control element 640 may also receive the operational signal. The control element 640 may then control the switch states of the variable-impedance transmission lines based on the selected transmission mode. In particular, the control element 640 may control the switch states so that the matching network 608 provides a desired impedance transformation for a given amplification level provided by the PA 604. In this manner, the PA circuit 600 may be tuned to achieve desired performance in terms of return loss, output power, power-added efficiency, etc.

For example, the control element 640 may set switches in transmission line 628, 632, and 636 in a first switch state when the PA 604 is to provide a first amplification level; and may set the switches in a second switch state when the PA 604 is to provide a second amplification level. In some embodiments, the switches of the variable-impedance transmission lines may be independently controlled. For example, the switches of the variable-impedance transmission lines 628 and 632 may be set to a first switch state, while the switch of the variable-impedance transmission line 636 is set to a second switch state. For another example, the switch of the variable-impedance transmission line 628 may be set to a first switch state, while the switch of the variable-impedance transmission line 632 is set to a second switch state.

While the present embodiment describes the operational signal as being indicative of transmission mode of the PA circuit 600, the operational signal may be indicative of other operational parameters in other embodiments. For example, in one embodiment, an operational signal may be generated as a feedback signal that indicates an output power or power-added efficiency of the PA 604. In such embodiments, the control element 640 may vary the characteristic impedance of the transmission lines 628, 632, and/or 636 based on the feedback signal, for example, to maintain desired operation of the PA circuit 600.

Providing the transmission lines as electrically variable tuning elements may allow the PA circuit 600 to be electrically tuned in situ without having to manually exchange lumped element tuning elements or modify laminates.

Figure 7:
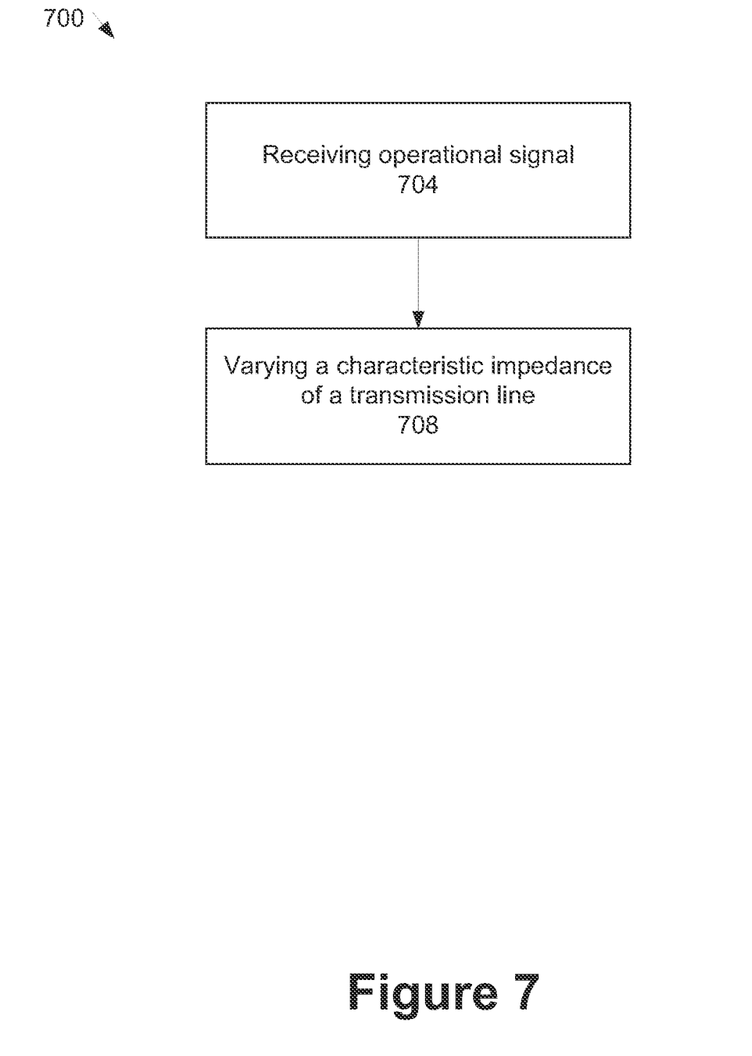
FIG. 7 is a flowchart depicting operation of a wireless communication device in accordance with some embodiments.

FIG. 7 is a flowchart illustrating an operation 700 of a control element of a PA circuit in accordance with some embodiments. The control element may be similar to the control element 640 described above.

At 704, the operation 700 may include receiving an operational signal. The operational signal may be provided to a control element of a PA circuit by a transceiver of a wireless communication device. See, for example, FIG. 8 below. The operational signal may provide information as to a transmission mode in which the wireless communication device is operating or to another operational parameter.

At 708, the operation 700 may include controlling one or more switches of a variable-impedance transmission line to vary a characteristic impedance of the transmission line. This may be done in a manner such that a matching network, which includes the transmission line, is to provide a desired impedance transformation based on the transmission mode in which the wireless communication device is operating.

Figure 8:
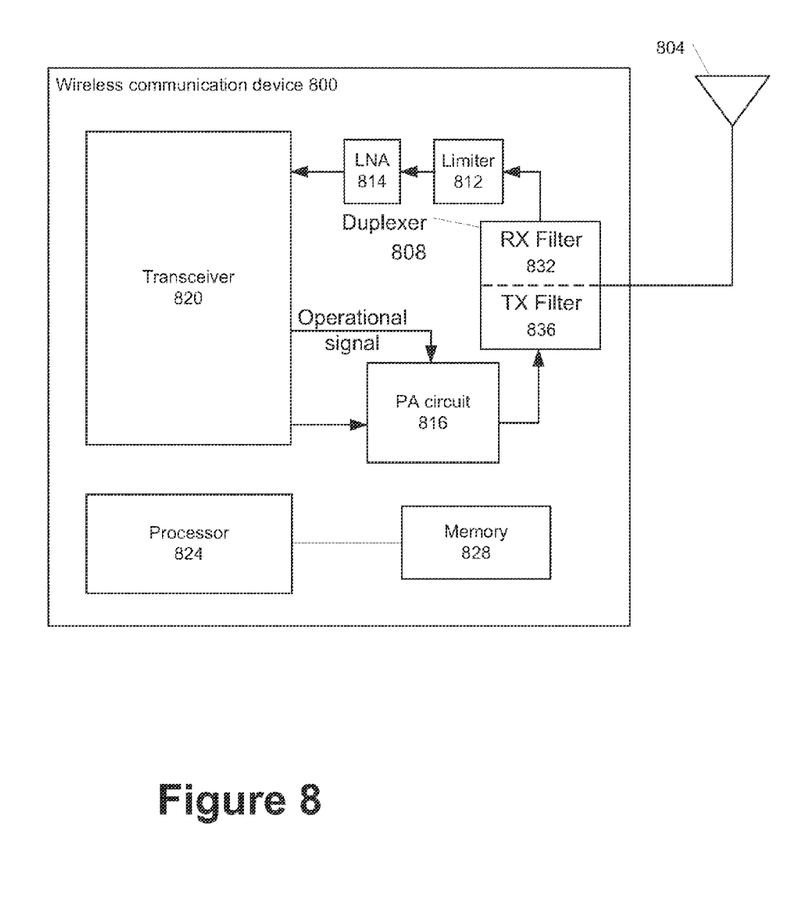
FIG. 8 is a wireless communication device in accordance with some embodiments.

A wireless communication device 800 is illustrated in FIG. 8 in accordance with some embodiments. The wireless communication device 800 may have an antenna structure 804, a duplexer 808, a limiter 812, a low-noise amplifier (LNA) 814, a power amplifier (PA) circuit 816, a transceiver 820, a processor 824, and a memory 828 coupled with each other at least as shown. The PA circuit 816 may be similar to and substantially interchangeable with PA circuit 600.

In various embodiments, the duplexer 808 may include a receive (RX) filter 832. The RX filter 832 and TX filter 836 may include various types of filter devices such as, but not limited to, surface acoustic wave devices and bulk acoustic wave devices.

The antenna structure 804 may include one or more antennas to transmit and receive radio frequency (RF) signals over the air. The antenna structure 804 may be coupled with the duplexer 808 that operates to selectively couple the antenna structure with the limiter 812 or the PA circuit 816.

When transmitting outgoing RF signals, the TX filter 836 may couple the antenna structure 804 with the PA circuit 816. The PA circuit 816 may receive RF signals and operational signals from the transceiver 820. The PA circuit 816 may have a PA to amplify the RF signals with a desired amplification level based on the operating transmission mode. The PA circuit 816 may further include a control element to receive the operational signal and to control variable-impedance transmission lines of a matching network based on the operating transmission mode. The matching network may provide the amplified RF signals to the antenna structure 804 for over-the-air transmission.

When receiving incoming RF signals, the RX filter 832 may couple the antenna structure 804 with the limiter 812. The limiter 812 may pass through the RF signal to the LNA 814. The LNA 814 may amplify the RF signal to facilitate further processing and provide the amplified signal to the transceiver 820.

The processor 824 may execute a basic operating system program, stored in the memory 828, in order to control the overall operation of the wireless communication device 800. For example, the main processor 824 may control the reception of signals and the transmission of signals by transceiver 820. The main processor 824 may be capable of executing other processes and programs resident in the memory 828 and may move data into or out of memory 828, as desired by an executing process.

The transceiver 820 may receive outgoing data (e.g., voice data, web data, e-mail, signaling data, etc.) from the processor 824, may generate RF signals to represent the outgoing data, and provide the RF signals to the PA circuit 816. Conversely, the transceiver 820 may receive RF signals from the LNA 814 that represent incoming data. The transceiver 820 may process the RF signals and send incoming signals to the processor 824 for further processing. The transceiver 820 may also generate the operational signal based on the operating transmission mode.

While the present embodiment describes the PA circuit 816 having the variable-impedance transmission lines, other embodiments may utilize the variable-impedance transmission lines in additional/alternative locations. For example, in some embodiments, the LNA 814, duplexer 808, and/or antenna 804 may utilize variable-impedance transmission lines that are controlled to tune operation of respective elements.

In various embodiments, the wireless communication device 800 may be, but is not limited to, a mobile telephone, a paging device, a personal digital assistant, a text-messaging device, a portable computer, a desktop computer, a base station, a subscriber station, an access point, a radar, a satellite communication device, or any other device capable of wirelessly transmitting/receiving RF signals.

Those skilled in the art will recognize that the wireless communication device 800 is given by way of example and that, for simplicity and clarity, only so much of the construction and operation of the wireless communication device 800 as is necessary for an understanding of the embodiments is shown and described. Various embodiments contemplate any suitable component or combination of components performing any suitable tasks in association with wireless communication device 800, according to particular needs. Moreover, it is understood that the wireless communication device 800 should not be construed to limit the types of devices in which embodiments may be implemented.

Various examples are described below.

Example 1 includes an apparatus comprising: a first conductor configured as at least part of a forward path of a transmission line; a second conductor configured as at least part of a return path of the transmission line; a third conductor; and a switch coupled with the third conductor to isolate the third conductor in a first switch state and to configure the third conductor as at least part of the forward path or the return path in a second switch state.

Example 2 includes the apparatus of example 1, wherein the apparatus is associated with a first characteristic impedance when the switch is in the first switch state and a second characteristic impedance when the switch is in the second switch state.

Example 3 includes the apparatus of example 1, wherein the apparatus is associated with a first capacitance when the switch is in the first switch state and a second capacitance when the switch is in the second switch state.

Example 4 includes the apparatus of example 1, wherein the apparatus is associated with a first inductance when the switch is in the first switch state and a second inductance when the switch is in the second switch state.

Example 5 includes the apparatus of example 1, wherein a distance between the forward path and the return path when the switch is in the first switch state is different from a distance between the forward path and the return path when the switch is in the second switch state.

Example 6 includes the apparatus of example 1, further comprising: a plurality of conductors, including the third conductor, wherein one or more switches, including the switch, is coupled with the plurality of conductors to isolate the plurality of conductors when the switch is in the first switch state and to configure the plurality of conductors as additional parts of the forward path or as additional parts of the return path when the switch is in the second switch state.

Example 7 includes the apparatus of example 1, wherein the transmission line is a microstrip transmission line.

Example 8 includes the apparatus of example 1, wherein the transmission line is a coaxial transmission line.

Example 9 includes the apparatus of example 1, wherein the first, second, and third conductors are flat conductors coupled in parallel with one another and the apparatus further comprises: a substrate having a surface coupled with the first, second, and third conductors.

Example 10 includes the apparatus of example 9, wherein the switch comprises a silicon-on-insulator switch placed in parallel with the transmission lines.

Example 11 includes the apparatus of example 1, wherein the switch comprises a field effect transistor.

Example 12 includes a wireless communication device comprising: an antenna structure; and a power amplifier (PA) circuit having a power amplifier to receive a radio frequency (RF) signal; a matching network having a transmission line, the matching network to be coupled with the power amplifier and the antenna structure, the matching network to transform an impedance; and a control element coupled with the matching network to control a characteristic impedance of the transmission line.

Example 13 includes the wireless communication device of example 12, wherein the transmission line includes a first conductor configured as at least part of a forward path of the transmission line; a second conductor configured as at least part of a return path of the transmission line; a third conductor; and a switch coupled with the control element and the third conductor, the switch to isolate the third conductor in a first switch state and to configure the third conductor as at least part of the forward path or the return path in a second switch state based on control signals received from the control element.

Example 14 includes the wireless communication device of example 13, wherein the transmission line is associated with a first characteristic impedance when the switch is in the first switch state and a second characteristic impedance when the switch is in the second switch state.

Example 15 includes the wireless communication device of example 13, wherein a distance between the forward path and the return path when the switch is in the first switch state is different from a distance between the forward path and the return path when the switch is in the second switch state.

Example 16 includes the wireless communication device of example 13, further comprising: a plurality of conductors, including the third conductor, wherein one or more switches, including the switch, are coupled with the plurality of conductors to isolate the plurality of conductors when the switch is in the first switch state and to configure the plurality of conductors as additional parts of the forward path or as additional parts of the return path when the switch is in the second switch state.

Example 17 includes the wireless communication device of example 13, wherein the switch comprises a silicon-on-insulator switch placed in parallel with the third conductor.

Example 18 includes the wireless communication device of example 13, wherein the switch comprises a field effect transistor.

Example 19 includes a method comprising: receiving, with a control element of a power amplifier circuit, an operational signal; and controlling, with the control element, one or more switches that are coupled with one or more conductors of a transmission line to vary a characteristic impedance of the transmission line.

Example 20 includes the method of example 19, wherein said controlling comprises: setting a first switch to a first switch state to provide the transmission line with a distance between forward and return paths of the transmission line.

Example 21 includes the method of example 20, wherein said controlling comprises: setting the first switch to a second switch state to provide the transmission line with another distance between forward and return paths of the transmission line.

Although the present disclosure has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present disclosure. Those with skill in the art will readily appreciate that the teachings of the present disclosure may be implemented in a wide variety of embodiments. This description is intended to be regarded as illustrative instead of restrictive.

What is claimed is:

1. An apparatus comprising:
   a first conductor configured as at least part of a forward path of a transmission line;
   a second conductor configured as at least part of a return path of the transmission line;
   a third conductor; and
   a switch coupled with the third conductor to isolate the third conductor in a first switch state and to configure the third conductor as at least part of the forward path or the return path in a second switch state.

2. The apparatus of claim 1, wherein the apparatus is associated with a first characteristic impedance when the switch is in the first switch state and a second characteristic impedance when the switch is in the second switch state.

3. The apparatus of claim 1, wherein the apparatus is associated with a first capacitance when the switch is in the first switch state and a second capacitance when the switch is in the second switch state.

4. The apparatus of claim 1, wherein the apparatus is associated with a first inductance when the switch is in the first switch state and a second inductance when the switch is in the second switch state.

5. The apparatus of claim 1, wherein a distance between the forward path and the return path when the switch is in the first switch state is different from a distance between the forward path and the return path when the switch is in the second switch state.

6. The apparatus of claim 1, further comprising:
   a plurality of conductors, including the third conductor,
   wherein one or more switches, including the switch, is coupled with the plurality of conductors to isolate the plurality of conductors when the switch is in the first switch state and to configure the plurality of conductors as additional parts of the forward path or as additional parts of the return path when the switch is in the second switch state.

7. The apparatus of claim 1, wherein the transmission line is a microstrip transmission line.

8. The apparatus of claim 1, wherein the transmission line is a coaxial transmission line.

9. The apparatus of claim 1, wherein the first, second, and third conductors are flat conductors coupled in parallel with one another and the apparatus further comprises:
   a substrate having a surface coupled with the first, second, and third conductors.

10. The apparatus of claim 9, wherein the switch comprises a silicon-on-insulator switch placed in parallel with the transmission lines.

11. The apparatus of claim 1, wherein the switch comprises a field effect transistor.

12. A wireless communication device comprising:
   an antenna structure; and
   a power amplifier (PA) circuit having a power amplifier to receive a radio frequency (RF) signal;
   a matching network having a transmission line, the matching network to be coupled with the power amplifier and the antenna structure, the matching network to transform an impedance; and
   a control element coupled with the matching network to control a characteristic impedance of the transmission line, wherein the transmission line includes:
      a first conductor configured as at least part of a forward path of the transmission line;
      a second conductor configured as at least part of a return path of the transmission line;
      a third conductor; and
      a switch coupled with the control element and the third conductor, the switch to isolate the third conductor in a first switch state and to configure the third conductor as at least part of the forward path or the return path in a second switch state based on control signals received from the control element.

13. The wireless communication device of claim 12, wherein the transmission line is associated with a first characteristic impedance when the switch is in the first switch state and a second characteristic impedance when the switch is in the second switch state.

14. The wireless communication device of claim 12, wherein a distance between the forward path and the return path when the switch is in the first switch state is different from a distance between the forward path and the return path when the switch is in the second switch state.

15. The wireless communication device of claim 12, further comprising:
   a plurality of conductors, including the third conductor,
   wherein one or more switches, including the switch, are coupled with the plurality of conductors to isolate the plurality of conductors when the switch is in the first switch state and to configure the plurality of conductors as additional parts of the forward path or as additional parts of the return path when the switch is in the second switch state.

16. The wireless communication device of claim 12, wherein the switch comprises a silicon-on-insulator switch placed in parallel with the third conductor.

17. The wireless communication device of claim 12, wherein the switch comprises a field effect transistor.

18. A method comprising:
   receiving, with a control element of a power amplifier circuit, an operational signal; and
   controlling, with the control element, one or more switches that are coupled with one or more conductors of a transmission line to vary a characteristic impedance of the transmission line, wherein said controlling comprises:
      setting a first switch to a first switch state to provide the transmission line with a distance between forward and return paths of the transmission line.

19. The method of claim 18, wherein said controlling comprises: setting the first switch to a second switch state to provide the transmission line with another distance between forward and return paths of the transmission line.

* * * * *